(12) United States Patent
Mountford et al.

(10) Patent No.: US 11,856,480 B2
(45) Date of Patent: Dec. 26, 2023

(54) HAPTIC GUIDANCE AND NAVIGATION TO MOBILE POINTS OF ENTRY

(71) Applicant: Ford Global Technologies, LLC, Dearborn, MI (US)

(72) Inventors: Joy Mountford, Mountain View, CA (US); Melissa Kim, Los Altos, CA (US); Chengchao Zhu, San Jose, CA (US)

(*) Notice: Subject to any disclaimer, the term of this patent is extended or adjusted under 35 U.S.C. 154(b) by 279 days.

(21) Appl. No.: 17/032,463

(22) Filed: Sep. 25, 2020

(65) Prior Publication Data

US 2021/0099834 A1 Apr. 1, 2021

Related U.S. Application Data

(60) Provisional application No. 62/907,243, filed on Sep. 27, 2019.

(51) Int. Cl.
| | |
|---|---|
| *H04W 4/024* | (2018.01) |
| *H04W 4/02* | (2018.01) |
| *G08B 6/00* | (2006.01) |
| *G09B 21/00* | (2006.01) |
| *E05F 15/73* | (2015.01) |
| *H04W 88/02* | (2009.01) |

(52) U.S. Cl.
CPC ............ *H04W 4/024* (2018.02); *E05F 15/73* (2015.01); *G08B 6/00* (2013.01); *G09B 21/003* (2013.01); *H04W 4/023* (2013.01); *E05Y 2400/10* (2013.01); *E05Y 2400/66* (2013.01); *E05Y 2900/531* (2013.01); *G09B 21/007* (2013.01); *H04W 88/02* (2013.01)

(58) Field of Classification Search
CPC ........... E05F 15/73; E05F 15/76; E05F 15/77; E05Y 2400/10; E05Y 2400/66; E05Y 2400/80; E05Y 2900/531; G08B 6/00; G09B 21/003; G09B 21/007; H04W 4/023; H04W 4/024; H04W 4/40; H04W 4/80; H04W 8/005; H04W 88/02
See application file for complete search history.

(56) References Cited

U.S. PATENT DOCUMENTS

| | | | |
|---|---|---|---|
| 9,082,239 B2* | 7/2015 | Ricci ....................... G06F 16/25 |
| 10,953,852 B1* | 3/2021 | Krishnamurthi ..... G05D 1/0276 |
| 2015/0154711 A1* | 6/2015 | Christopulos .......... G06Q 40/08 |
| | | | 705/7.29 |

(Continued)

*Primary Examiner* — Quan Zhen Wang
*Assistant Examiner* — Rajsheed O Black-Childress
(74) *Attorney, Agent, or Firm* — Brandon Hicks; Eversheds Sutherland (US) LLP

(57) ABSTRACT

The present disclosure includes a haptic guidance and navigation system for a vehicle that includes two Blutooth modules configured as beacons (using, for example, Bluetooth®, Low-Energy (BLE) modules) disposed on the front-center end and back-center end of a vehicle. The system may include an application operative on a mobile device that is also configured for BLE. The BLE modules onboard the vehicle may be uniquely associated with the vehicle with a unique identification (ID), and used to determine relative distances and angles between the BLEs and the mobile device. The haptic guidance and navigation system may generate haptic and other feedback using the mobile device and haptic output devices onboard the vehicle, to guide a user to a determined point of entry for the vehicle.

18 Claims, 6 Drawing Sheets

(56) References Cited

U.S. PATENT DOCUMENTS

| | | | |
|---|---|---|---|
| 2017/0279957 A1* | 9/2017 | Abramson et al. | H04M 1/6075 |
| 2019/0232868 A1* | 8/2019 | Lenneman | B60W 50/0098 |
| 2020/0090437 A1* | 3/2020 | Ichinose | G07C 9/00309 |
| 2021/0086723 A1* | 3/2021 | Krishnamurthi | H04W 4/025 |

* cited by examiner

HAPTIC GUIDANCE AND NAVIGATION TO MOBILE POINTS OF ENTRY

CROSS-REFERENCE TO RELATED APPLICATIONS

The present disclosure claims priority to and the benefit of U.S. Provisional Application No. 62/907,243, filed Sep. 27, 2019, which is hereby incorporated by reference herein in its entirety.

FIELD

The present disclosure relates to a haptic location and guidance system for ad-hoc beacon networks.

BACKGROUND

While many existing solutions help the visually impaired evade obstacles in their path, navigate a smartphone interface, or walk towards a destination, one especially difficult endeavor for the visually impaired involves finding points of entry for buildings or moving vehicles. For example, moving vehicles, such as private-owned cars, are difficult to correctly identify. It can also be challenging to find the vehicle door, door handle, roof of the car, available seat, etc.

Current solutions leverage satellite positioning system information, but this data is not sufficiently precise to guide an individual to a specific location that is, for example, close enough to an entry point of a building or vehicle, but far away enough from the target that they are not endangering themselves by, for example, obstructing the door to the entry point.

Visually impaired individuals are known to use haptics on canes or mobile platforms to avoid obstacles or receive navigational guidance, but only for general navigation or navigation to a general location. There is no existing solution for leading visually impaired individuals to the point of entry of a location. Even if the point of entry relative to the vehicle is always the same, the physical geolocation is ever changing depending on the current location of the vehicle and the type of vehicle. Moreover, conventional solutions do not account for physical characteristics associated with each particular vehicle used for transport or for providing navigation to a vehicle entry point that positions sight-impaired individuals to enter a vehicle while avoiding moving hazards associated with the vehicle door, such as an opening door edge.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
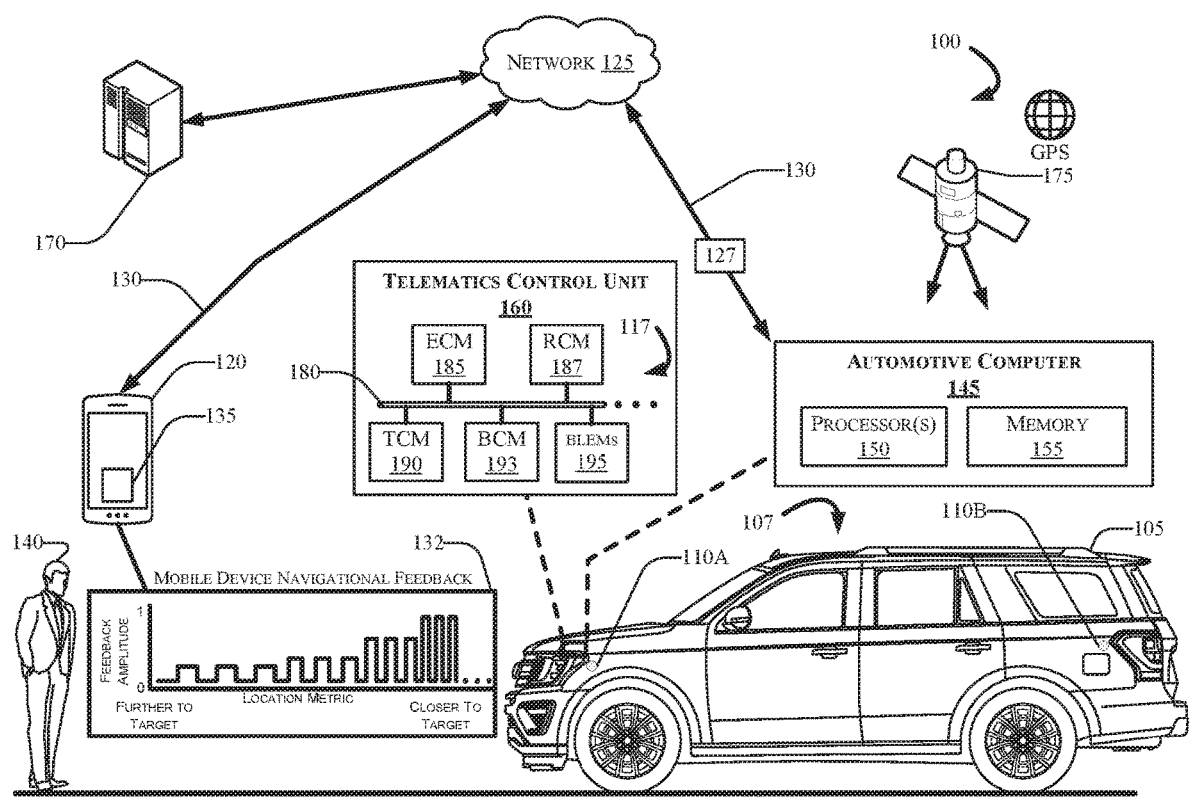
FIG. 1 depicts an example computing environment in which techniques and structures for providing the systems and methods disclosed herein may be implemented.

In some embodiments, the present disclosure includes a vehicle with two Blutooth modules configured as beacons (using, for example, Bluetooth® Low-Energy (BLE) modules) on the front-center end and back-center end of a vehicle. Embodiments descired herein may also include an application operative on a mobile device that is also configured for BLE.

In the present disclosure, the BLE modules may be uniquely associated with the vehicle via a unique identification (ID) that is continuously broadcasted. When a person requests a vehicle (i.e., hails a ride hail service vehicle), the ride hail application may communicate with a remote server to request a vehicle match for the user request. The server can match the vehicle according to closest available location, time to availability to a particular location, ability to accommodate special needs of a requesting ride hail user, and other factors.

Once matched, the remote server may transmit unique identification information to both the vehicle computer and the mobile device (and more precisely, to the application operative on the mobile device). The communication from the remote server may include the unique vehicle identification of the ride hail vehicle that has been selected, and may further include identification values for the configured BLE modules on the matched vehicle. When the BLE modules on the matched vehicle are proximate to the requesting mobile device, the mobile device application may cause the mobile device to begin listening for the unique IDs associated with the BLE modules of the matched vehicle. Accordingly, as the matched vehicle is broadcasting the BLE signal in search of the requesting mobile device, the mobile device is also listening for the matched ride hail vehicle. As the vehicle approaches the approximate location of the requesting device, the mobile device may communicate with the vehicle as well as with the remote server to determine a relative position of the mobile device with respect to the BLE modules on the matched vehicle.

When the ride hail vehicle is within a predetermined range of the requesting device, the requesting mobile device and the vehicle computer may communicate with one another using low-energy protocols when the matched ride hail vehicle has arrived in proximity to the requesting device (for example, 10 meters, 8 meters, etc.).

Leveraging triangulation of Bluetooth® beacons significantly increases accuracy of dynamic tracking and navigation, and the Bluetooth® beacon connections to a server enables a series of functions to automatically occur when certain conditions are met. For example, automatically opening the vehicle door can trigger haptics in the frame of the vehicle that can provide audible and tactile cues that may assist the sight impaired individual to self-navigate into the vehicle. Also, audible tones or messages for guidance can trigger a haptic output in other portions of the vehicle interior (e.g., the seat cushion), which can assist the visually impaired rider to then find an open position to sit in the vehicle without having to request human assistance or force reliance on manual exploration of the vehicle interior to find an open spot to sit.

In a typical ride hail situation, both fully sighted and visually impaired users rely on drivers to find and authenticate their vehicle. For example, visually impaired users may surmise that the vehicle that they heard pull up is theirs, get in, and ask the driver, "Are you [Driver's name]?" to confirm that they are getting into the correct car. However, in a situation where the mobile vehicle is an autonomous vehicle (AV), there is no driver present to aid in finding the vehicle or authenticating the vehicle, and the ride hail may not include another human passenger that can provide verbal confirmation cues.

Current solutions for finding and identifying a specific vehicle are also highly reliant on small visual markers. Haptics and audio signals are thus especially useful for visually impaired individuals, but are also useful to fully sighted individuals. For example, when conventional ride hail platforms match an individual with a ride hail vehicle, the ride hail requester is often given information like the make of the vehicle, a vehicle color, and a license plate number. In other aspects, the ride hail vehicle may include some signage or insignia displayed either outside the vehicle, on a small device inside the vehicle, or on the requesting device mobile platform screen that they can use to hail their ride. Even for sighted ride hail customers, these cues may be easily missed, especially in a place like an airport where there are multiple vehicles stopping to pick up specific people from a large crowd. The alternative solutions, such as lights around the automatic doors magnetic band, provide much better visual cues and can be a clearer signal when paired with other haptic, audio, or visual solutions.

These and other advantages of the present disclosure are provided in greater detail herein.

Illustrative Embodiments

The disclosure will be described more fully hereinafter with reference to the accompanying drawings, in which exemplary embodiments of the disclosure are shown.

FIG. 1 depicts an example computing environment 100 that can include one or more vehicle(s) 105, an automotive computer 145, a telematics control unit (TCU) 160, and a mobile device 120. The mobile device 120 may be communicatively coupled with the vehicle 105 via one or more network(s) 125, which may communicate via one or more wireless channel(s) 130. The mobile device 120 may include one or more application(s) 135. In one example embodiment, a user 140 may be a pedestrian seeking a ride hail service using the application(s) 135. Although described herein as a solution suited for sight-impaired individuals, it should be appreciated that embodiments described in the present disclosure may be suitable for all users to navigate to ride hail vehicles and other points of entry associated with busy locations that may not be clearly identifiable as to a particular point of entry (e.g., a door on a vehicle among many vehicles in the vicinity).

The mobile device, although depicted generally as a smartphone, may be another device, such as, for example, wearable glasses, a smart cane used by vision impaired individuals, smart clothing such as footwear enabled for Bluetooth® communication and processing tasks described herein, and/or other devices, which are contemplated.

The vehicle 105 may include an automotive computer 145, which may include one or more processor(s) 150 and memory 155. The vehicle 105 may further include a Telematics Control Unit (TCU) 160, which may be disposed in communication with and/or be a part of the automotive computer 145. The TCU 160 may, in some example embodiments, be disposed in communication with the mobile device 120, and one or more server(s) 170, which may be associated with and/or include a Telematics Service Delivery Network (TSDN). The vehicle 105 may also receive and/or be in communication with a Global Positioning System (GPS) 175.

Although illustrated as a sport utility, the vehicle 105 may take the form of another passenger or commercial vehicle, such as, for example, a car, a truck, a van, a crossover vehicle, a minivan, a taxi, a bus, a trolley, etc. Further, the vehicle 105 may be a manually driven vehicle, and/or be configured to operate in a fully autonomous (e.g., driverless) mode or partially autonomous mode (e.g., autonomous levels 1-5).

According to an example embodiment, a user 140 may control the one or more application(s) 135 (hereafter the application 135") operating on the mobile device 120 to request a match to a ride hail configured with a haptic guidance and navigation system 107 (hereafter "system 107"). In some aspects, the application 135 may cause the mobile device 120 to communicate with the vehicle 105 (and more particularly, with the automotive computer 145, the Bluetooth® Low-Energy Modules (BLEMs) 195, and other aspects of the system 107) through the one or more channel(s) 130, which may be encrypted and established between the mobile device 120 and a Telematics Control Unit (TCU) 160. The mobile device 120 may communicate with the TCU 160 using a wireless transmitter (not shown in FIG. 1) associated with the TCU 160 using a wireless communication network, such as, for example, the one or more network(s) 125. The wireless channel(s) 130 are depicted in FIG. 1 as communicating via the one or more network(s) 125. It should be also appreciated that the wireless channel(s) 130 may also be disposed in direct communication with the mobile device 120 without communication through the server(s) 170). For example, the mobile device 120 may send mobile device navigational data 127 to the vehicle 105, and/or to the server(s) 170, which may, in turn, store the data 127 and transmit portions of the data 127 to the vehicle 105.

The one or more network(s) 125 illustrate an example of one possible communication infrastructure in which the connected devices may communicate. The one or more network(s) 125 may be and/or include the Internet, a private network, public network or other configuration that operates using any one or more known communication protocols such as, for example, transmission control protocol/Internet protocol (TCP/IP), Bluetooth®, Wi-Fi, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The TCU 160 may provide a software and hardware infrastructure, which may be functional as part of the system 107, for performing aspects of the present disclosure. For example, the TCU 160 can provide communication and control access for two or more Electronic Control Units (ECUs) 117 using a Controller Area Network (CAN) bus 180. Among the ECUs 117, the BLEMs 195 may be disposed onboard the vehicle 105 on opposite ends of the vehicle 105, such that they may triangulate distances between each other and the mobile device 140. The BLEMs 195 may connect with each other and with other vehicle modules through a CAN bus 180.

The CAN bus 180 may be configured as a multi-master serial bus standard for connecting two ECUs as nodes using a message-based protocol that can be configured and/or programmed to allow the ECUs 117 to communicate with each other in applications. The CAN bus 180 may be or include a high-speed CAN (which may communicate at bit speeds up to 1 Mb/s on CAN and/or 5 Mb/s on a CAN Flexible Data Rate (CAN FD)). In one aspect, the CAN bus 180 can include a low speed or fault tolerant CAN (up to 125 Kbps), which may use a linear bus configuration. In some aspects, the ECUs may communicate with a host computer (e.g., the automotive computer 145 and/or the server(s) 170, etc.) and may also communicate with one another without the necessity of a host computer. The CAN bus 180 may connect the ECUs 117 with the automotive computer 145 such that the automotive computer 145 may retrieve information from, send information to, and otherwise interact with the ECUs 117 to perform steps described according to embodiments of the present disclosure. The CAN bus 180 may connect CAN bus nodes (e.g., the ECUs 117) to each other through a two-wire CAN bus 180, which may be a twisted pair having a nominal characteristic impedance.

The ECUs 117, when configured as nodes in the CAN bus 180, may each include a central processing unit, a CAN controller, and a transceiver (not shown in FIG. 1). In an example embodiment, the ECUs 117 associated with the TCU 160 can include an Engine Control Module (ECM) 185, a Restraint Control Module (RCM) 187, a Transmission Control Module (TCM) 190, a Body Control Module (BCM) 193, and/or at least two Bluetooth®, Low-Energy Module (BLEMs) 195. The ECUs 117 are described for exemplary purposes only and are not intended to be limiting or exclusive. Control and/or communication with other control modules not shown in FIG. 1 is possible, and such control is contemplated.

In some aspects, the TCU 160 may control aspects of the vehicle 105 through the control modules 185, 187, 190, 193, 195, etc., and implement one or more instruction sets received from the application 135 operating on the mobile device 120.

For example, as shown in FIG. 1, the BLEMs 195 may include a BLEM 110A and a BLEM 110B, as depicted onboard the vehicle 105. It should be noted that although the system 107 is described as using BLEM, it may use any wireless communication device and/or protocol, including near field communication, short range communication, RF communications, etc. The system 107 may include the BLEMs 110A and 110B, among other possible communication modules, to orient the vehicle 105 with respect to a position of the requesting mobile device (e.g., the mobile device 120). For example, when the system 107 determines that the mobile device 120 is proximate to the target point of entry (e.g., at a position just outside of a vehicle door such that the door can swing open without the possibility of striking the user 140), the system 107 may trigger one or more door actuation mechanisms that open a vehicle door, trigger one or more haptic actuators that provide mobile device navigational feedback 132 onboard the vehicle 105 and/or through the mobile device 120 and actuate one or more LED lamps, auditory signals, and other feedback that can provide guidance input for a sight impaired ride hail user. These cues may provide mechanisms for the vision impaired ride hail user to self-orient in the vehicle without groping around for a free space, and without the need to request assistance from a human driver or passenger.

FIG. 1 depicts the mobile device navigational feedback 132 as a signal having an amplitude between 0 (no output) to 1 (full output). The feedback amplitude may be associated with various location metrics, as described in greater detail, including an angle between the heading of the mobile device 120 and a target point proximate to the vehicle 105, a distance between that same point and the mobile device 120, and other possible metrics.

The automotive computer 145 may include one or more processor(s) 150 and a computer-readable memory 155. The automotive computer 145 may be installed in an engine compartment of the vehicle 105 (or elsewhere in the vehicle 105) as part of the haptic guidance and navigation system 107, in accordance with the disclosure. The automotive computer 145 may include, in one example, the one or more processor(s) 150, and a computer-readable memory 155, which may be separate from, but disposed in communication with the TCU 160. In other example embodiments, the TCU 160 may be integrated with and/or be incorporated with the automotive computer 145, such that they are housed in a common housing. The computing system architecture of the automotive computer 145 may omit certain computing modules. It should be readily understood that the computing environment depicted in FIG. 1 is one example of a possible implementation according to the present disclosure, and thus, it should not to be considered limiting or exclusive.

The one or more processor(s) 150 may be disposed in communication with one or more memory devices (e.g., the memory 155 and/or one or more external databases (not shown in FIG. 1). The one or more processor(s) 150 may utilize the memory 155 to store programs in code and/or to store data for performing navigation, triangulation, delivery of haptic feedback, auditory feedback, photonic feedback, and other modes of communication, in accordance with the disclosure.

The memory 155 may be a non-transitory computer-readable memory. The processor(s) 150 may be configured to execute computer-executable instructions stored in the memory 155 for performing various functions of the system 107, as well as for performing vehicle control capabilities in accordance with the disclosure. Consequently, the memory 155 may be used for storing code and/or data code and/or data for performing operations in accordance with the disclosure.

The memory 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc. The memory 155 may be one example of a non-transitory computer-readable medium, and may be used to store programs in code and/or to store data for performing various operations in accordance with the disclosure. The instructions in the memory 155 can include one or more separate programs, each of which can include an ordered listing of computer-executable instructions for implementing logical functions.

In another exemplary implementation, some or all components of the automotive computer 145 may be shared with the TCU 160.

The memory 155 may store various code modules such as, for example, a secure communication controller (not shown in FIG. 1) for establishing the one or more wireless channels 130 (which may, in some embodiments, be encrypted channel(s)) between the mobile device 120, the TCU 160, and/or the automotive computer 145.

Figure 2A:
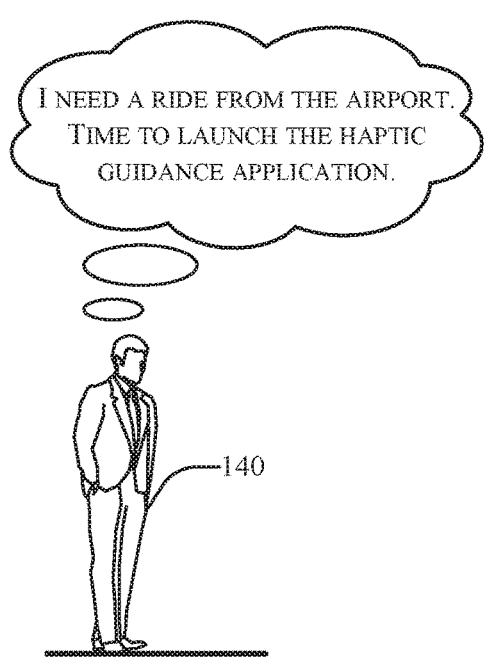
FIG. 2A depicts a user contemplating a need to call a ride hail in accordance with the present disclosure.
Figure 2B:
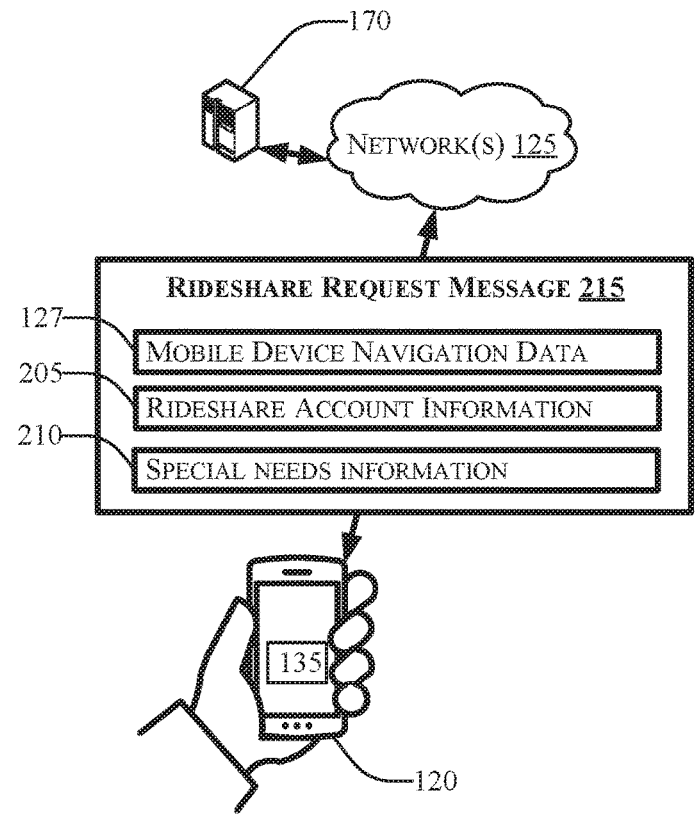
FIG. 2B depicts a mobile device operating as part of a haptic guidance and navigation system in accordance with the present disclosure.
Figure 2C:
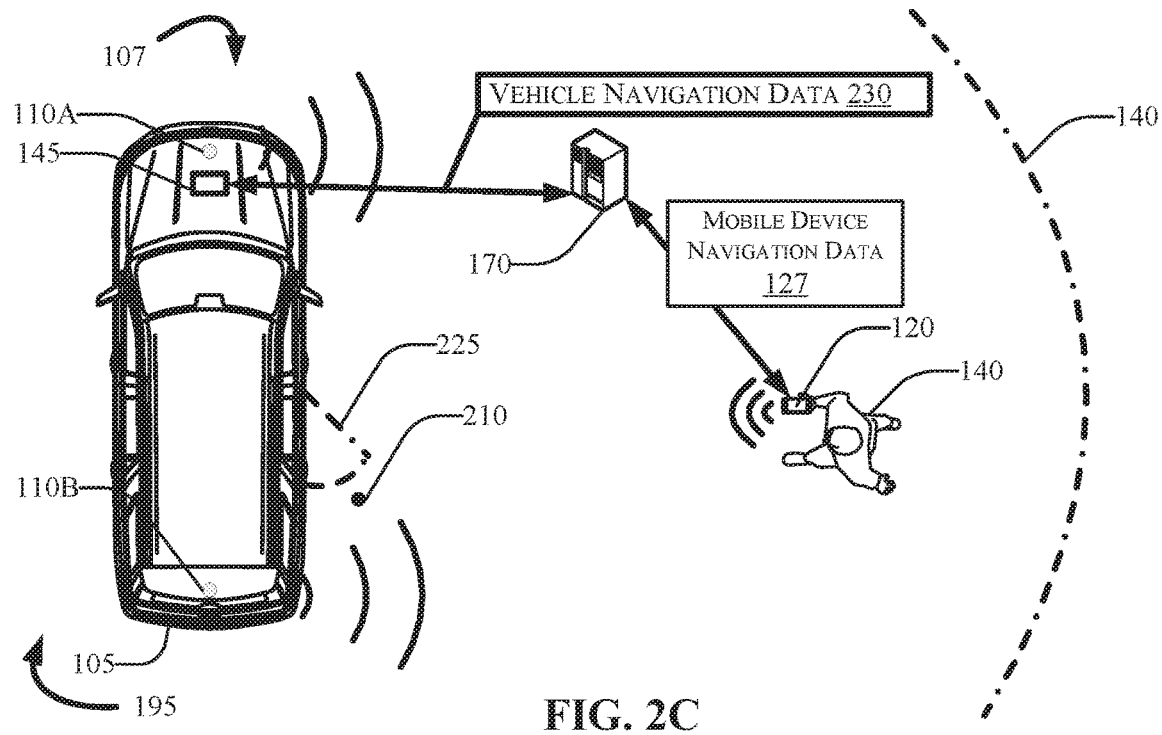
FIG. 2C depicts a user navigating to a ride hail vehicle using the haptic guidance and navigation system in accordance with the present disclosure.

By way of a brief overview, FIGS. 2A through 2C describe the preliminary steps of a user 140 contemplating a ride hail (in FIG. 2A), calling/requesting the ride hail service using his mobile device 120 (as shown in FIG. 2B), and receiving (at the mobile device 120) a matched ride hail vehicle 105 by the server(s) 170 (as shown in FIG. 2C) in accordance with the present disclosure.

With respect to FIG. 2A, the user 140 is depicted contemplating a ride hail. It should be appreciated that both vision-impaired individuals and sighted individuals may benefit from embodiments of the present disclosure described herein, at least because identification of a ride hail vehicle in a crowded field of vehicles is often challenging even when visual cues may be observed by the requesting user. When the requesting user 140 is vision impaired, the challenge of finding a matched ride hail in response to the request may be heightened due to the unavailability of visual indicators of the expected vehicle, driver, etc. For example, although sighted users may be able to identify a vehicle color, a license plate number, or vehicle model, etc., these cues may not be available to the vision impaired. FIG. 2B depicts a mobile device operating as part of a haptic guidance and navigation system in accordance with the present disclosure. FIG. 2A depicts the user 140 thinking of such challenges.

FIG. 2B depicts the user 140 holding the mobile device 120, which may be configured to execute the application(s) 135. In one example embodiment, the application(s) 135 may communicate information to and from the vehicle 105, the server(s) 170, and other devices, to provide navigational guidance to a matched ride hail vehicle (e.g., the vehicle 105). For example, the mobile device 120, and more particularly, the application(s) 135, may cause the mobile device 120 to transmit a ride hail request message 215 to the server(s) 170 via the network(s) 125. The ride hail request message 215 may include information for unique identification of the sending device (e.g., the mobile device 120), including the mobile device navigation data 127, which will be discussed in greater detail in FIG. 4. The mobile device navigation data 127 can uniquely identify the mobile device 120, and provide locating information that provides the server(s) 170 with GPS coordinates, heading information, and other locating information associated with the mobile device 120. The mobile device navigation data 127 may also include relative motion information for the mobile device. The application(s) 135 may access the device accelerometer data, and provide relative movement information of the mobile device 120. Examples of relative movements may include, for example, walking speed, a heading in which the mobile device is pointed, and other information associated with movement of the mobile device 120.

After transmitting the ride hail request message 215 to the server(s) 170, the ride hail platform (not shown in FIG. 2B) may match a ride hail vehicle (e.g., the vehicle 105 of FIG. 1) based on the ride hail request message 215 and logistics factors associated with the vehicle 105 (e.g., current vehicle location, traffic conditions, scheduling information, etc.). The server(s) 170 may dispatch the vehicle to the user 140 location in response to the ride hail request message 215. Once the vehicle 105 arrives at the approximate location of the requesting user 140, the user 140 must first identify the correct vehicle (if there are multiple vehicles arriving at the location), then position themselves at a point of entry 210 as shown in FIG. 2C to enter the vehicle 105. In a situation where multiple vehicles have arrived at the same time, e.g., outside an airport, even fully sighted users find it difficult to identify the assigned ride hail vehicle. Moreover, when a user is sight impaired, without the system 107 the user 140 may find it difficult to locate the point of entry to the vehicle 105 and position themselves proximate to the vehicle for entry. Accordingly, the system 107 may provide navigational guidance for users, regardless of their visual capability, to correctly identify their vehicle using their app, which triggers haptic, auditory, and other communication to the user 140 that can lead the user 140 directly to the single, correct vehicle, and to an optimal position for entering the vehicle.

FIG. 2C depicts the user 140 as he navigates to a point of entry 210, depicted in FIG. 2C as a point proximate to a vehicle door 225 of the vehicle 105, such as the time of pickup location, etc. The vehicle 105 may be configured to include the haptic guidance and navigation system 107, in accordance with the present disclosure. A point of entry generally refers to a position for vehicle ingress/egress that positions a rider to be clear of any hazards or obstacles (e.g., a vehicle door 225 as it opens).

The BLEMs 195 collectively refer to the Bluetooth® low-Energy modules 110A and 110B in this regard. The BLEMs 195 may be disposed at various points on the vehicle, such as, for example, on opposite ends of the vehicle 105. The forward BLEM 110A and the rear BLEM 110B, as shown in FIG. 2C represent two such positions, where the distance between BLEMs 195 is a known distance that may be used in conjunction with a third Bluetooth® transmitting device (e.g., the mobile device 120) to determine a distance between the third device and each of the BLEMs 195, and by extension, a distance between the mobile device 120 and the point of entry 210. It should be appreciated that at least the two BLEMs 110A and 110B are included such that a real-time or substantially real-time triangulation of the mobile device 120 may be calculated, and instructions are transmitted to the mobile device 120 that can provide feedback cues to the user 140 as he navigates to the point of entry 210. In some example embodiments, the BLEMs 195 could further include any number of additional modules disposed in other areas of the vehicle 105 cabin and/or body, which could increase the accuracy and/or range of the system 107.

The BLEMs 196 may be respectively configured to broadcast a unique ID. Accordingly, the modules 110A and 110B may transmit the Bluetooth® low-energy signal that includes the unique IDs responsive to one or more triggering events. Triggering events may be detection of another BLEM signal (e.g., from the mobile device 120), an instruction from the automotive computer 145, an instruction from the server(s) 170, or other possible triggers. The server(s) 170 may match the ride hail vehicle 105 and the mobile device 120, and provide the mobile device identification data (which may be included as part of the mobile device navigation data 127) to the automotive computer 145. The vehicle navigation data 230 may also include the BLEM identifications associated with the BLEMs 195, which are sent to the mobile device 120. When BLEMs 195 and the mobile device 120 are within a predetermined operative range 235 (which may be, for example, 10 meters, 5 meters, 1 meter, etc.), the vehicle 105 and mobile device 105 may communicate with one another via low-energy communication protocols responsive to the mobile platform application 135 recognizing the unique IDs that are respectively broadcast by the BLEMs 195 on the vehicle 105.

Figure 3:
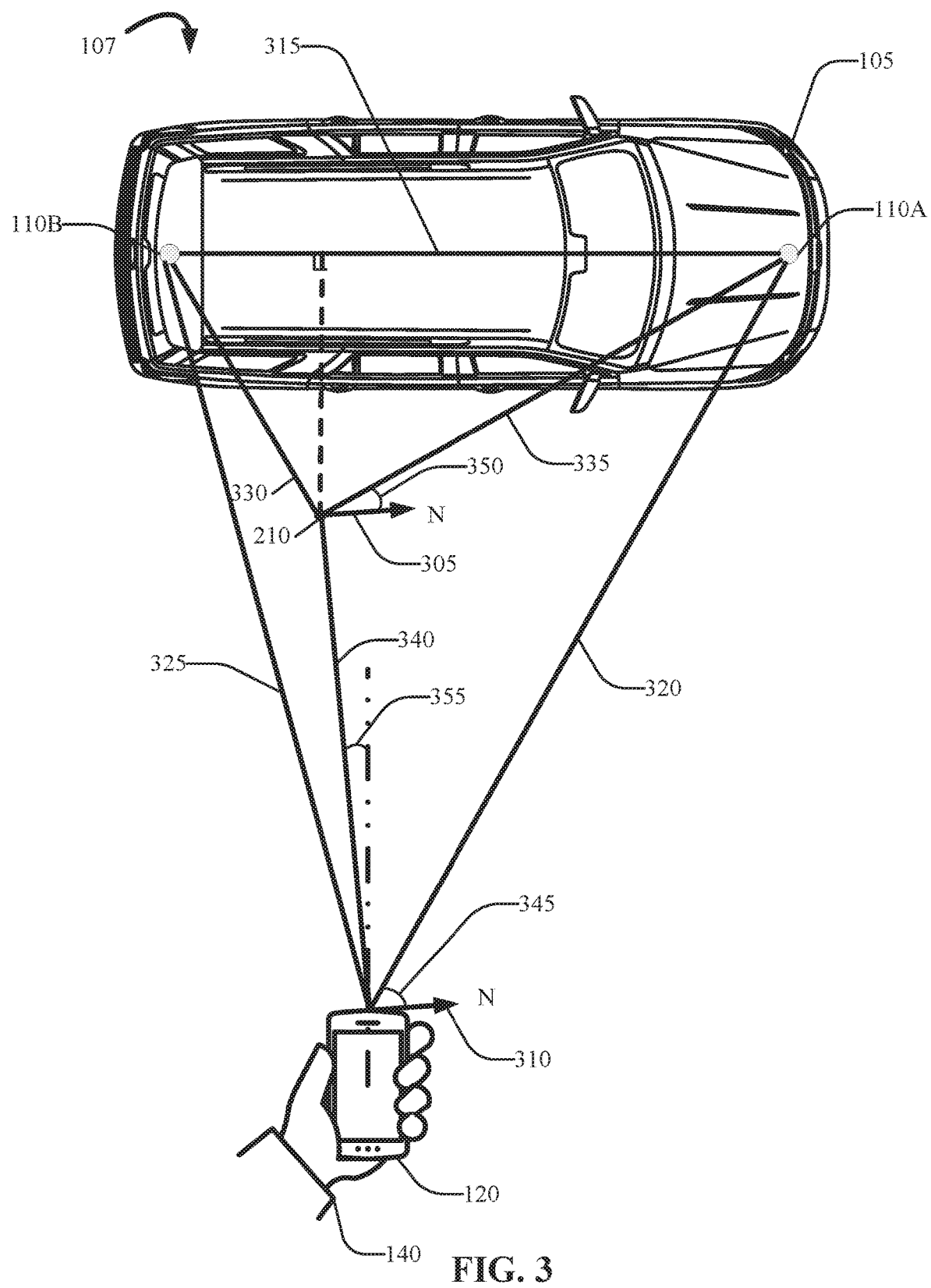
FIG. 3 depicts the mobile device navigating to a point of entry using the haptic guidance and navigation system in accordance with the present disclosure.

FIG. 3 depicts the mobile device 120 used for navigating to the point of entry 210 using the haptic guidance and navigation system 107 in accordance with the present disclosure. Once the vehicle 105 and mobile platform operative on the mobile device 120 (e.g., the application(s) 135) are "paired" or otherwise associated with one another via Bluetooth®, the two Bluetooth® beacons (BLEMs 110A and 110B, which are collectively referred to as "BLEMs 195") communicate their live geographical location as well as the car's magnetometer and accelerometer data (via communication to the CAN bus 180) to the app 135. The app 135 continuously publishes the live geographical location of the BLEMs 195 as well as the live geographical location, magnetometer, and accelerometer data of the mobile device 120 and the server(s) 170 (as shown in prior figures). The server(s) 170 may combine the location data associated with the BLEMs 195 with the vehicle navigation data (e.g., the vehicle navigation data 230 as shown in FIG. 2C), which may include magnetometer and accelerometer data obtained from and/or using resources controlled by the TCU 160 (as shown in FIG. 1). The vehicle computer 145 and/or the server(s) 170 may use the various data to determine the vehicle heading 305.

The server(s) 170 may also aggregate the mobile device navigational data 127, which can include data generated by a Bluetooth® module (not shown in FIG. 3) on the mobile device 120, with the mobile device 120 magnetometer and accelerometer data, to determine the heading 310 of the mobile device 120. More particularly, the mobile device heading 310 describes the direction the phone 120 is pointed with respect to geographic North. By combining the data points of the vehicle 105 and the mobile device 120, the server(s) 170 can determine, by triangulation, a real-time and dynamic location of the user 140, who is holding the mobile device 120, relative to the nearby point of entry 210.

The vehicle 105 may be positioned with respect to geographic north. Accordingly, the system 107 may determine the vehicle heading 305, and determine the mobile device heading 310 with respect to geographic north. In other aspects, the system 107 may determine an angle 345 between the mobile device heading with respect to the geographic north, determine an angle 350 of the vehicle 105 orientation with respect to geographic north, and use the angles 345 and 350 to determine an angle 355 between the point of entry 210 and the mobile device 120.

The angle 355 (referred to hereafter as "the locating angle 355") may provide real-time or substantially real-time visual, haptic, auditory, and other cues to assist the user 140 in orienting their heading toward the desired point of entry 210. In one aspect, the system 170 may provide feedback via the mobile device 120 as the device changes position with respect to the point of entry 210. For example, as the mobile device turns away from the target point of entry 210, a tone, haptic feedback pattern, or other output by the mobile device 120 may provide an indication of relative position and movement that advances the user 140 toward the desired point of entry 210. Haptic feedback may begin at a first pattern, which may be constant, relatively low amplitude, etc., once the mobile device 120 pairs successfully with the BLEMs 195. The haptic and other feedback may change in intensity, pattern, etc., as the device 120 increases or decreases the locating angle 355.

The system 107 may also modulate the haptic, auditory, and other output based on distance between the mobile device 120 and the target point of entry 210. In one example embodiment, the system 107 may determine a distance between the BLEM 110A and 110B (for example, two feet away from the back side-door on the right side of the vehicle). The system 107 may determine a distance 320 between the BLEM 110A and the mobile device 120. The system 107 may further determine a distance 325 between the BLEM 110B and the mobile device 120.

In another aspect, the system 107 may evaluate a distance between the BLEMs 195 and the point of entry. For example, a distance 330 is calculated that determines the distance between the BLEM 110B and the point of entry 210. A distance 335 is calculated that determines the distance between the BLEM 110B and the point of entry 210. Accordingly, a mathematical distance 340 may be determined between the position of the user 140 (and more particularly, the device 120) and the point of entry 210. As the mobile device 120 approaches the point of entry 210, the mobile device 120 may modulate the amplitude of the output (sound, haptic, light, etc.).

In some aspects, the system 107 may determine distances using a BLEM received signal strength indicator (RSSI), by using a Time-of-Flight (ToF) calculation associated with signal propagation from the mobile device 120 to the BLEMs 195, and/or by using another calculation method such as GPS II, GPS III, etc.

Figure 4A:
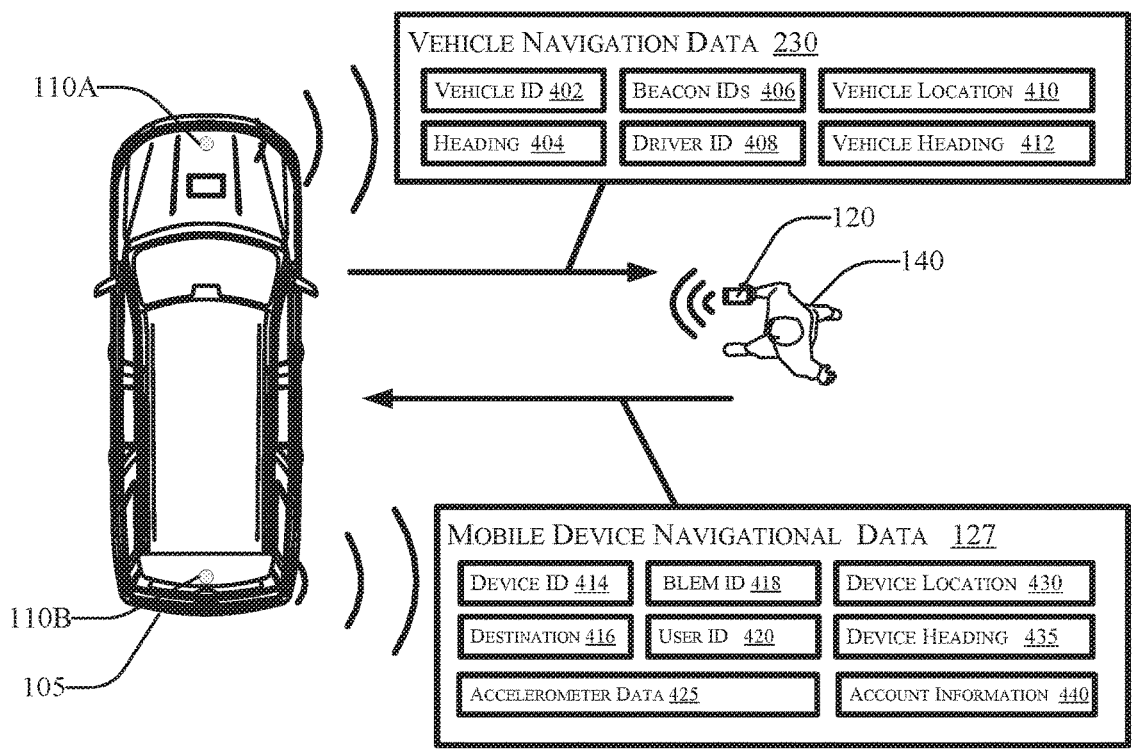
FIGS. 4A-4C illustrate location and navigation steps associated with locating a point of entry for a ride hail vehicle using the haptic guidance and navigation system in accordance with the present disclosure.
Figure 4B:
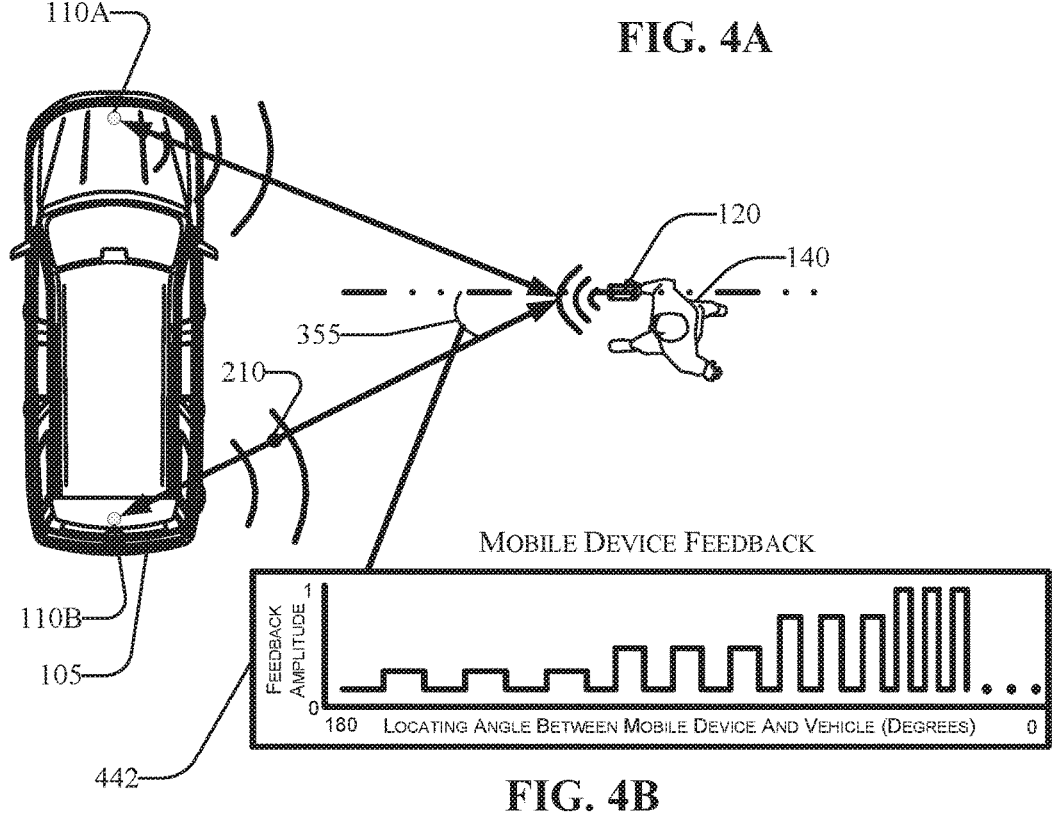
Figures 4C, 5:
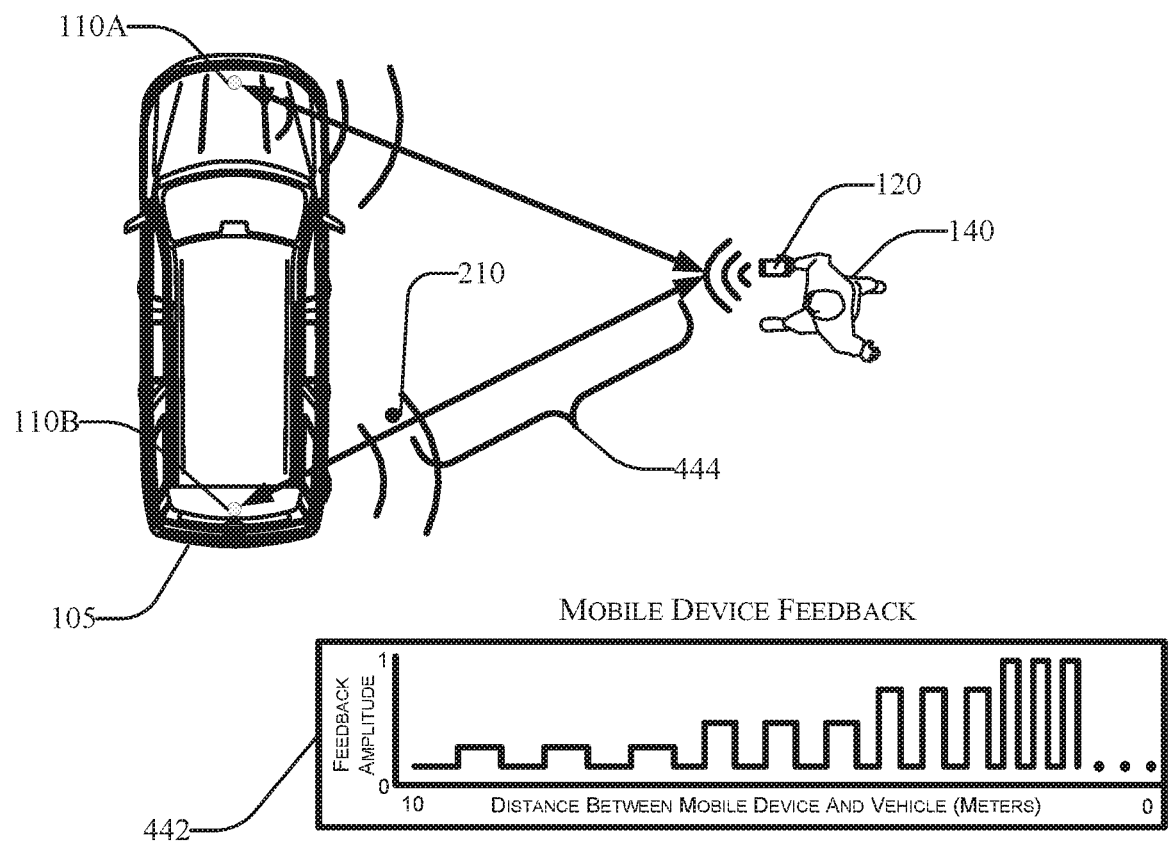
FIG. 5 illustrates a vehicle performing a door actuation in accordance with the present disclosure.

Considering the navigation steps in greater detail, FIG. 4A-4C illustrate location and navigation steps associated with locating the point of entry 210 for entering the vehicle 105, in accordance with the present disclosure. Considering FIG. 4A, the vehicle 105 is shown waiting for the user 140 as the user approaches the vehicle 105. The automotive computer 145 may transmit the vehicle navigation data 230 to the mobile device 120 (via the network(s) 125 or directly).

In one aspect, the vehicle navigation data 230 can include information that may dynamically change in real-time and also include information that is statically associated with the vehicle and driver (if the vehicle is not an autonomous vehicle). For example, the vehicle navigation data 230 may include a vehicle ID 402 that uniquely identifies the vehicle 105, a vehicle heading 404 indicative of real-time vehicle heading with respect to geographic north, two or more beacon IDs 406 that uniquely identify the BLEMs 195, driver information such as a driver ID 408, vehicle location information 410 that may provide GPS coordinates and other information, and vehicle heading information 412.

In other aspects, the mobile device navigational data 127 may also include information that is statically associated with the user 140 and with the mobile device 120, and may further include information that dynamically changes with time. For example, the data 127 may include a device ID 414, a mobile device BLEM ID 418, a user ID 420, accelerometer data 425, account information 440, device heading information 435, device location information 430, and other possible data.

According to embodiments described herein, after matching the mobile device 120 to the vehicle 105, the server(s) 170 may provide the mobile device navigational data 127 to the vehicle 105, and the vehicle navigational data 230 to the mobile device 120. Accordingly, the system 107 may use the respective data 230 and 127 for navigating the user 140 and the mobile device 120 to the point of entry. For example, as shown in FIG. 4B, the system 107 may output navigational cues based on calculated distances and angles between the mobile device 120 and the point of entry 210. The output may include feedback such as haptic output, auditory output, light output, etc., through the mobile device 120 as the user 140 orients himself to the point of entry 210.

When the user 140 is pointed in the wrong direction (e.g., a direction that leads the user 140 away from the point of entry 210) the feedback may change tone, intensity, pattern, etc. As an example, the locating angle 355 is larger when the user 140 is pointed away from the point of entry. Accordingly, the system 107 may determine the locating angle 355 using the mobile device navigational data 127 and the vehicle navigation data 230, determine a feedback amplitude for output 442 based on the locating angle 355, and output the feedback based at least in part on the locating angle 355.

FIG. 4C depicts the user 140 approaching the point of entry 210 using the system 107. As the distance 444 changes with respect to time, the feedback amplitude, pattern, frequency, etc., may be changed according to the distance 444. Accordingly, the system 107 may determine the distance 444 between the mobile device 120 and the point of entry 210 using the mobile device navigational data 127 and the vehicle navigation data 230, determine a feedback amplitude for the output 442 based on the distance 444, and output the feedback based at least in part on the distance 444.

In other aspects, the system 107 may generate the output 442 based on both of the distance 444 and the locating angle 355.

FIG. 5 depicts the user 140 approaching the point of entry 210 using the system 107, according to an embodiment. The system 107 may determine that the mobile device 120 is at a threshold distance from the point of entry 210, and generate a destination feedback output. An example may be a third pattern of haptic output, an auditory response, or another signal. The system 107 may trigger one or more vehicle actions responsive to arriving at the point of entry. For example, the vehicle 105 may cause the vehicle door 225 to open, and perform one or more secondary locating outputs.

In one aspect, a secondary locating output may include one or more haptic, auditory, or light generation outputs that can assist a sight impaired individual to locate a seat position. For example, a vehicle pillar may include haptic feedback devices that vibrate to provide tactile and auditory cues to a vision impaired rider that locates an open seat position. In another aspect, responsive to determining that the user 140 and mobile device 120 are in traveling position (e.g., inside the vehicle and sitting), the system 107 may generate one or more outputs that cause the vehicle to sound an alert, close a door, or take another action that may be selectable with system 107 configuration.

Figure 6:
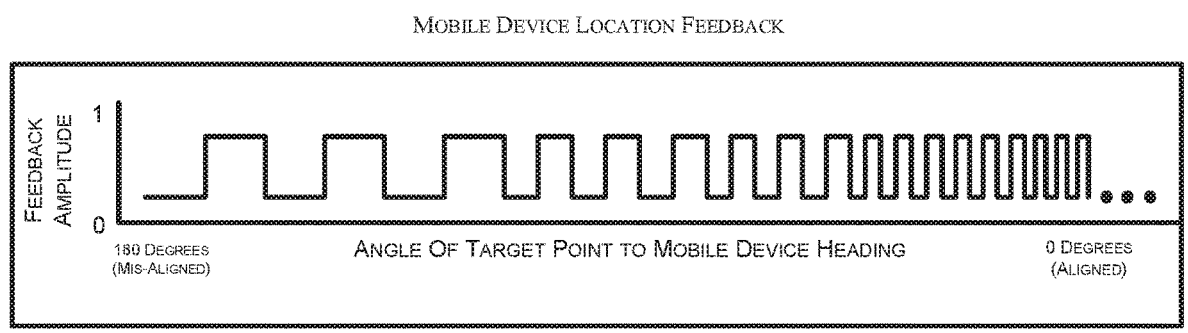
FIG. 6 depicts mobile device location feedback in accordance with the present disclosure.

FIG. 6 depicts mobile device location feedback in accordance with the present disclosure. In some aspects, the system may modulate haptic feedback based on the orientation and distance of the mobile device 120 to the point of entry 210. Aspects of the feedback amplitude may be modulated based on the locating angle, as shown in the example of FIG. 5. In one aspect, the angle may provide input data that is associated with the amplitude of the feedback, with the frequency of the feedback, and/or both the frequency and amplitude of the feedback.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is That which is claimed is:

1. A system, comprising:
a processor; and
a memory for storing executable instructions, the processor configured to execute the instructions to:
receive a ridehail request from a mobile device;
assign a vehicle to the ridehail request;
assign an identifier to the vehicle for the ridehail request;
receive, via one or more communication modules of the vehicle or via the mobile device, an indication of the identifier;
establish a communication pairing between the one or more communication modules and the mobile device based on receiving the indication of the identifier;
send, based on the pairing between the one or more communication modules and the mobile device, instructions to the mobile device that cause the mobile device to modulate a feedback output of the mobile device to a first feedback output;
receive, from a first communication module of a vehicle, a first distance to a mobile device;
receive, from a second communication module of the vehicle, a second distance to the mobile device;
determine an angle between the mobile device and a point of entry proximate the vehicle;
send instructions to the mobile device that cause the mobile device to modulate feedback output of the mobile device to a second feedback output based on the angle;
send instructions to a haptic feedback device of a vehicle interior to modulate a feedback output of the haptic feedback device, wherein the feedback output of the haptic feedback device guides a user of the mobile device to an open seat position within the vehicle;
determine that the user of the mobile device and the mobile device are in a traveling position; and
execute, upon determining that the user of the mobile device and the mobile device are in the traveling position, instructions to close a vehicle door.

2. The system according to claim 1, wherein the processor is further configured to execute the instructions to determine that the mobile device is at a threshold distance from the point of entry.

3. The system according to claim 2, wherein the processor is further configured to execute the instructions to generate a vehicle instruction to perform a vehicle action based on determining that the mobile device is at the threshold distance, wherein the vehicle action comprises opening a vehicle door based on the vehicle instruction.

4. The system according to claim 3, wherein the processor is further configured to execute the instructions to output a haptic feedback of the haptic feedback device of the vehicle interior based on the vehicle instruction.

5. The system according to claim 1, wherein the processor is further configured to execute the instructions to send the instructions to the mobile device that cause the mobile device to modulate the feedback output of the mobile device, wherein the feedback output of the mobile device is based on a distance between the mobile device and the point of entry of the vehicle.

6. The system according to claim 1, wherein the first communication module comprises a Bluetooth Low-Energy Module (BLEM).

7. The system according to claim 1, wherein the feedback output of the haptic feedback device of the vehicle interior are tactile and auditory cues, wherein the haptic feedback device of the vehicle interior comprises one or more of a frame of the vehicle, a seat cushion, and a vehicle pillar.

8. The system according to claim 7, wherein the mobile device is determined to be in a traveling position when the mobile device is inside the vehicle.

9. A system, comprising:
a processor associated with an automotive computer for a vehicle; and
a memory for storing executable instructions, the processor configured to execute the instructions to:
receive a ridehail request from a mobile device;
assign a vehicle to the ridehail request;
assign an identifier to the vehicle for the ridehail request;
receive, via one or more Bluetooth Low-Energy Modules (BLEMs) of the vehicle or via the mobile device, an indication of the identifier;
establish a communication pairing between the one or more BLEMs and the mobile device based on receiving the indication of the identifier;
send, based on the pairing between the one or more BLEMs and the mobile device, instructions to the mobile device that cause the mobile device to modulate a feedback output of the mobile device to a first feedback output;
receive, from a first BLEM of the one or more BLEMs, a first distance to a mobile device;
receive, from a second BLEM of the one or more BLEMs, a second distance to the mobile device;
determine an angle between the mobile device and a point of entry proximate the vehicle;
send instructions to the mobile device that cause the mobile device to modulate a feedback output of the mobile device to a second feedback output, wherein the second feedback output of the mobile device is based on the angle between the mobile device and the point of entry of the vehicle;
determine that the mobile device is at a threshold distance from the point of entry;
generate a vehicle instruction to perform a vehicle action based on determining that the mobile device is at the threshold distance;
send instructions to a haptic feedback device of a vehicle interior to modulate a feedback output of the haptic feedback device, wherein the feedback output of the haptic feedback device guides a user of the mobile device to an open seat position within the vehicle;
determine that the user of the mobile device and the mobile device are in a traveling position; and
execute, upon determining that the user of the mobile device and the mobile device are in the traveling position, instructions to close a vehicle door.

10. The system according to claim 9, wherein the processor is further configured to execute the instructions to open a vehicle door based on the vehicle instruction.

11. The system according to claim 9, wherein the processor is further configured to execute the instructions to output tactile and auditory cues from the haptic feedback device of the vehicle interior based on the vehicle instruction, wherein the haptic feedback device of the vehicle interior comprises one or more of a frame of the vehicle, a seat cushion, and a vehicle pillar and wherein the mobile device is determined to be in a traveling position when the mobile device is inside the vehicle.

12. The system according to claim 9, wherein the processor is further configured to execute the instructions to send the instructions to the mobile device that cause the mobile device to modulate the feedback output of the mobile device, wherein the feedback output of the mobile device is based on a distance between the mobile device and the point of entry of the vehicle.

13. A method, comprising:
receiving a ridehail request from a mobile device;
assigning a vehicle to the ridehail request;
assigning an identifier to the vehicle for the ridehail request;
receiving, via one or more communication modules of the vehicle or via the mobile device, an indication of the identifier;
establishing a communication pairing between the one or more communication modules and the mobile device based on receiving the indication of the identifier;
sending, based on the pairing between the one or more communication modules and the mobile device, instructions to the mobile device that cause the mobile device to modulate a feedback output of the mobile device to a first feedback output;
receiving, from a first communication module of a vehicle, a first distance to a mobile device;
receiving, from a second communication module of the vehicle, a second distance to the mobile device;
determining an angle between the mobile device and a point of entry proximate the vehicle;
sending instructions to the mobile device that cause the mobile device to modulate a feedback output of the mobile device to a second feedback output based on the angle;
sending instructions to a haptic feedback device of a vehicle interior to modulate a feedback output of the haptic feedback device, wherein the feedback output of the haptic feedback device guides a user of the mobile device to an open seat position within the vehicle;
determining that the user of the mobile device and the mobile device are in a traveling position; and
executing, upon determining that the user of the mobile device and the mobile device are in the traveling position, instructions to close a vehicle door.

14. The method according to claim 13, further comprising determining that the mobile device is at a threshold distance from the point of entry.

15. The method according to claim 14, further comprising generating a vehicle instruction to perform a vehicle action based on determining that the mobile device is at the threshold distance, wherein the vehicle action comprises opening a vehicle door based on the vehicle instruction.

16. The method according to claim 13, further comprising outputting tactile and auditory cues from the haptic feedback device of the vehicle interior based on the vehicle instruction, wherein the haptic feedback device of the vehicle interior comprises one or more of a frame of the vehicle, a seat cushion, and a vehicle pillar.

17. The method according to claim 16, wherein the mobile device is determined to be in a traveling position when the mobile device is inside the vehicle.

18. The method according to claim 13, further comprising sending the instructions to the mobile device that cause the mobile device to modulate the feedback output of the mobile device, wherein the feedback output of the mobile device is based on a distance between the mobile device and the point of entry of the vehicle.

* * * * *